UNITED STATES PATENT OFFICE.

HEINRICH BRÜNE, OF NEUSTADT-ON-THE-HARDT, GERMANY.

DRYING VEGETABLE MATERIALS.

1,204,845.   Specification of Letters Patent.   Patented Nov. 14, 1916.

No Drawing.   Application filed February 13, 1913.   Serial No. 748,108.

*To all whom it may concern:*

Be it known that I, HEINRICH BRÜNE, doctor engineer, and citizen of the German Empire, and resident of Neustadt-on-the-Hardt, Germany, with the post-office address Hetzelstrasse 22, have invented new and useful Improvements in Drying Vegetable Materials, of which the following is a specification.

This invention relates to the process of drying vegetable substances by the "wet press" method, and has for its object to provide an improved process, one of the chief advantages of which is its economy.

Heretofore, it has been customary to dry wet substances by adding thereto material of a different nature than the substance to be dried, and then subjecting the mixture to pressure to extrude the moisture from the mixture, thus entailing a considerable expense in transporting and storing the drying material and diminishing the economy of conducting the process. Furthermore, it has heretofore been necessary, after the drying process, to separate and remove the drying material from the substance dried thereby, thus further complicating the process.

According to the present invention, the drying material is taken from the finished product, that is, the material added to the substance to be dried is a portion of the finished product which has been previously dried. In this way, all cost of providing additional drying material is eliminated.

The invention is especially adapted for drying sliced turnips, brewers' grains, potatoes, oil cake, and similar substances. In drying turnips, for instance, turnips previously dried by the present process are mixed with the turnips to be dried, and the mixture subjected to pressure, preferably in a "wet press," to extrude the moisture from the mixture. The porous nature of the turnips or other substance added to the material to be dried, facilitates the drying operation, and enables the applied pressure to easily force the moisture in the material to be dried through the small conduits, and interstices of the previously dried material. It has been found in practice that the added material does not absorb moisture, but facilitates the expressing operation and serves to conduct the moisture away from the material to be dried.

What I claim is:—

1. The process of drying vegetable materials, which consists in mixing with the material to be dried, like material which has been previously dried, and then pressing the mixture to extrude the moisture from the mixture.

2. The process of drying turnips, which consists in mixing the turnips to be dried with previously dried turnips, and then pressing the mixture to extrude the moisture from the mixture.

3. The process of drying wet vegetable materials by pressing, which consists in mixing with the wet material to be pressed, dry material taken from the previously pressed finished product, and then pressing the mixture to extrude the moisture from the mixture.

In testimony, that I claim the foregoing as my invention, I have signed my name, in presence of two witnesses, this 31st day of January, 1913.

HEINRICH BRÜNE.

Witnesses:
  EMIL TOPF,
  JEAN GRUND.